Figure 1:
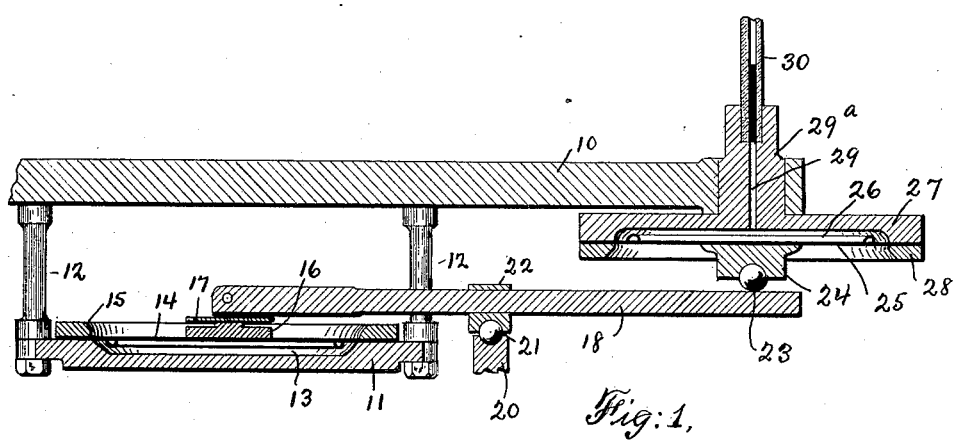

T. FRENCH.
APPARATUS FOR COMPENSATING FOR EXPANSION OF FLOW IN INDICATING DEVICES.
APPLICATION FILED JAN. 2, 1913.

1,090,468.

Patented Mar. 17, 1914.

2 SHEETS—SHEET 1.

Witnesses:
Thomas French, Inventor,
By his Attorney

T. FRENCH.
APPARATUS FOR COMPENSATING FOR EXPANSION OF FLOW IN INDICATING DEVICES.
APPLICATION FILED JAN. 2, 1913.

1,090,468.

Patented Mar. 17, 1914.

2 SHEETS—SHEET 2.

UNITED STATES PATENT OFFICE.

THOMAS FRENCH, OF RUMFORD, MAINE.

APPARATUS FOR COMPENSATING FOR EXPANSION OF FLOW IN INDICATING DEVICES.

1,090,468.  Specification of Letters Patent.  Patented Mar. 17, 1914.

Application filed January 2, 1913. Serial No. 739,606.

*To all whom it may concern:*

Be it known that I, THOMAS FRENCH, of Rumford, county of Oxford, State of Maine, have invented a new and useful Improvement in Apparatus for Compensating for Expansion of Flow in Indicating Devices, of which the following is a full, clear, and exact description.

My invention relates to improvements in indicating devices where great precision is requisite, and more especially to apparatus in which differences of pressure, thickness, or other measurement is indicated by the rise and fall of liquid in the gage or indicating glass. This rise and fall is usually produced by the movement of a diaphragm operated on in some way by the force, material, or thing to be measured or indicated, and sometimes the measurements are not absolutely accurate because of temperature variations which affect the expansible liquid in the indicator.

The object of my invention is to improve indicating apparatus of this kind so that the indications or measurements given in the indicator or gage glass will be absolutely accurate and dependable. In carrying out this idea, I arrange a diaphragm or diaphragms acted on by an expansible liquid similar to that in the registering diaphragm directly connected with the indicator or gage glass, so that any expansion of liquid opposite the registering diaphragm will be compensated for by an exactly similar expansion in a second chamber or chambers having a diaphragm, but with the diaphragm in said second chamber or chambers acting oppositely to the one in the registering chamber. In this way, as will be pointed out in the description which follows, it is possible to obtain absolute accuracy.

In the specification which follows I have described apparatus which accomplishes the above result, and which is suitable for the purpose, but without the idea of limiting myself to the particular apparatus shown.

Reference is to be had to the accompanying drawings forming a part of this specification, in which similar reference characters indicate corresponding parts in all the views.

Figure 2:
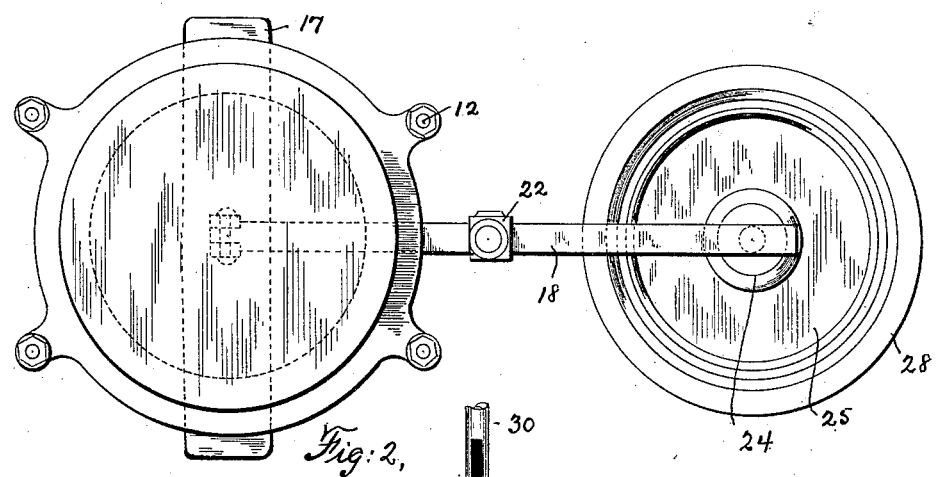
Figure 3:
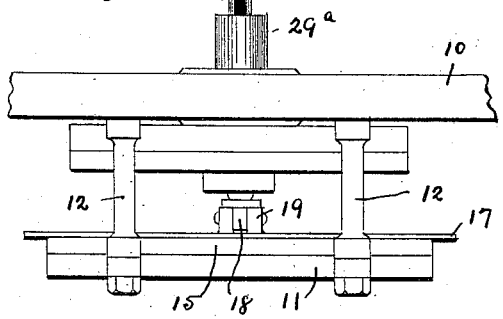
Figure 4:
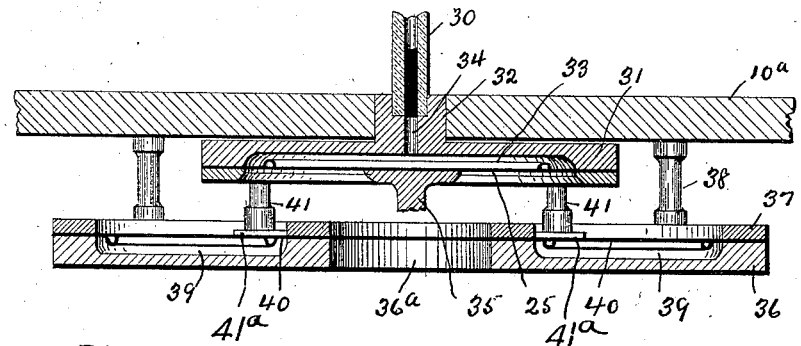
Figure 5:
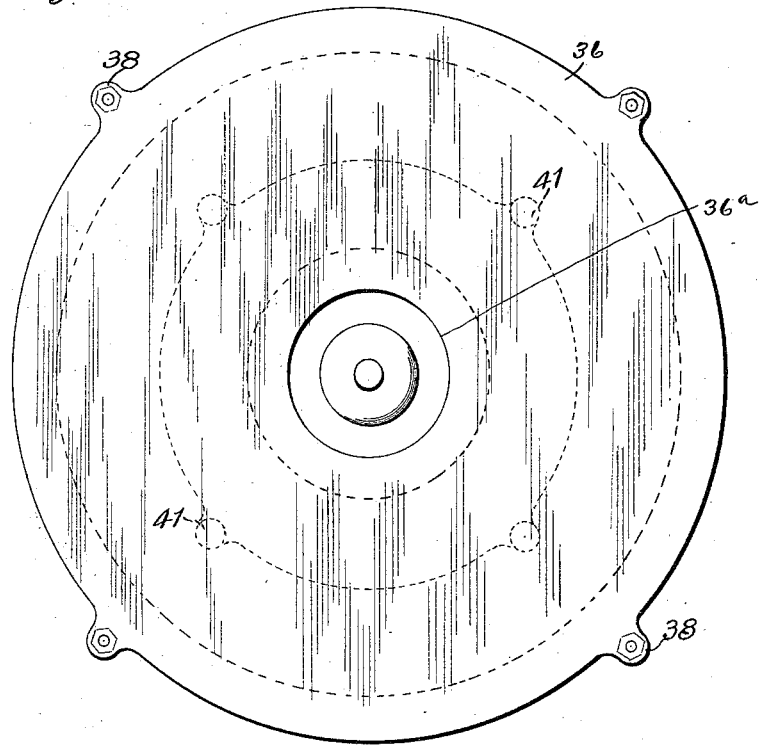

Figure 1 is a vertical sectional elevation of a form of apparatus embodying my invention. Fig. 2 is an inverted plan view of the apparatus shown in Fig. 1. Fig. 3 is an end view thereof. Fig. 4 is a sectional elevation of a slight modification of the apparatus, and Fig. 5 is an inverted plan of the structure shown in Fig. 4.

In the drawings, 10 represents any suitable supporting framework, beneath which is a plate 11 which is connected rigidly to the framework by posts 12, and which has a chamber 13 adapted to contain an expansible liquid, and over which is arranged a diaphragm 14 which can be of any usual kind, being held in place in the customary manner by a ring 15. A pressure plate 16 is arranged in the center of the diaphragm, and bears upon a stiff flat spring 17 which extends across the top of the diaphragm chamber, and this spring is stiff enough to form a rigid support for the fulcrum of a lever 18, as presently described, except when there is sufficient expansion of the liquid behind the diaphragm 14 to move the plate 16 against the pressure of the spring. The lever 18 extends laterally from above the chamber 13, and is fulcrumed on the spring directly above the block or plate 16, being pivoted in any convenient manner, and I have shown it as being pivoted between two ears 19 on the spring 17. The lever 18 is moved by an arm 20 which can be actuated in any usual or preferred way by the thing being measured, as for instance the thickness of a certain material which is passing beneath it or a variable pressure which acts upon it, but there are so many ways of bringing pressure to bear on the arm or block 20, that I have not shown them, as this forms no part of my present invention.

The arm or block 20 has a bearing ball 21 which connects with the block 22, and this is slidable on the lever 18, but should be capable of retaining its position unless moved intentionally. Near its free end the lever 18 connects by means of the ball 23 or equivalent free connection, with a pressure plate or block 24, which bears against the surface 25, extending over a chamber 26 on the under side of the plate 27, and is held in place by a ring 28 as usual. Obviously the pressure chambers and their diaphragms can be of any preferred type, and I have shown them in a conventional way. The plate 27 has on the upper side a shank 29ª extending up through a part of the frame 10, and in this is a duct 29 connecting with the pressure liquid behind the diaphragm 25 and extending into the indicator or gage glass 30.

It will be seen from the foregoing description that as the two diaphragms 14 and 25 are acted on by a liquid having equal expansive qualities, and are acted on in opposite directions, there will be a point on the lever 18 at which the block 22 can be adjusted, and which will have no movement caused by the expansion of liquid in the pressure chambers 13 and 26. The block 22 is therefore adjusted at this point, and any temperature changes will therefore be compensated for by the opposite expansions at opposite ends of the lever, and so the movement imparted to the lever by reason of the block or arm 20, will be indicated with absolute accuracy in the glass 30, the liquid in the glass being forced up or down to correspond with the movement of the lever 18. Thus the instrument is adapted to indicators and measuring devices where the greatest precision is required.

In Figs. 4 and 5 I have shown a modification of the invention, in which the principle is the same, as liquid chambers and diaphragms are opposed so that the expansion of one compensates for the expansion of the other. As here illustrated, the frame 10ª has beneath it a plate 31, which has a shank 32 movable in the frame and carrying a gage or indicator glass 30 as already described. A diaphragm 25 corresponding to the one in the plate 27 already described, is stretched across the chamber 33, and suitably held in place. A duct 34 leads from the chamber 33 to the indicator glass 30. Beneath the frame 10ª is a relatively large plate 36 having a central hole 36ª opposite the center of the diaphragm 25, and the plate 36 and its clamping ring 37 are rigidly held in place by the posts 38 which are secured to the frame 10ª. The plate 36 has an annular chamber 39 therein in which is arranged a diaphragm 40, this being clamped between the plate 36 and ring 37 as usual, and posts 41 which support the plate 31 and its chamber, have plates 41ª at the bottom resting on the diaphragm 40, this arrangement being indicated clearly in dotted lines in Fig. 5. The impulses from the pressure or thing being measured are applied to the diaphragm 25 by the pressure plate or block 35, which can receive its impulses in any usual or preferred manner.

It will be noticed that the arrangement just described is the same in principle as that shown in Figs. 1 to 3, but in this case, the chamber 33 moves bodily toward and away from its diaphragm, and the pressure on the diaphragm 25 caused by variations of temperature on the liquid in the chamber 33, will be exactly compensated for and counter-balanced by the corresponding variations of pressure in the chamber 39.

From the foregoing description it will be seen that by having one pressure chamber and its diaphragm arranged to oppose and counter-balance the corresponding movement in the chamber or diaphragm of the registering mechanism, absolute accuracy is obtained, and that the structure can be varied in many ways without in the least affecting the principle of the invention.

I claim:—

1. A plurality of pressure chambers provided with diaphragms and containing expansible liquids, one of said chambers being sealed and the other connected with an indicator, means connecting the two pressure chambers, whereby the movement of one diaphragm by variations of pressure within its chamber shall be offset and compensated by a corresponding but opposite movement of the second diaphragm, and a pressure plate or block connecting with the diaphragm of the indicator chamber and adapted to be acted on by the force to be measured.

2. An apparatus such as described comprising a liquid containing chamber connected with an indicator and provided with a diaphragm, a second liquid containing chamber also provided with a diaphragm, a lever pivotally supported on the second diaphragm and having its free end arranged to act against the first diaphragm, and means adapted to be acted on from the force to be measured or indicated, and operating against the aforesaid lever.

3. An apparatus such as described comprising a liquid containing registering chamber connected with an indicator and provided with a diaphragm, a second liquid containing chamber sealed and having a diaphragm, a lever pivotally supported on the diaphragm of the second chamber so as to be acted on by the said diaphragm, a connection between the free end of the lever and the first diaphragm, and a block or sleeve adjustable on the lever and adapted to be acted upon by the force or thing to be measured.

4. An apparatus such as described comprising a registering chamber connected with an indicator and provided with a diaphragm, said chamber being adapted to contain a liquid, a second liquid containing chamber sealed and having a diaphragm, a lever pivoted on the second diaphragm, a free connection between the free end of the lever and the first diaphragm, and a block or sleeve adjustable on the lever and adapted to receive impulses from the force or thing to be measured or indicated.

5. An apparatus such as described comprising a registering liquid containing chamber having a diaphragm and connected with an indicator, a second liquid containing chamber sealed and also provided with a diaphragm, a lever pivotally supported on and acted on by the second diaphragm, a ball-joint connection between the free end of the lever and the first diaphragm, and a sliding abutment on the lever adapted to be acted on by the force or thing to be measured or indicated.

6. An apparatus such as described comprising a liquid containing pressure chamber connected with an indicator and provided with a diaphragm, a second liquid containing chamber sealed and also provided with a diaphragm, a spring member pressing against the diaphragm of the second chamber, a lever pivotally supported on said spring member and actuated by the diaphragm of the second chamber, a connection between the free end of the lever and the first diaphragm, and an abutment adjustable on the lever and adapted to receive impulses from the force or thing to be measured or indicated.

THOMAS FRENCH.

Witnesses:
RALPH T. PARKER,
GEORGE O. BISBEE.

Copies of this patent may be obtained for five cents each, by addressing the "Commissioner of Patents, Washington, D. C."